(12) United States Patent
Iveson

(10) Patent No.: US 9,856,982 B2
(45) Date of Patent: Jan. 2, 2018

(54) DEVICE FOR SUPPORTING MECHANICAL SEAL FACES

(71) Applicant: AES Engineering Ltd., Global Technology Centre, Mill Close (GB)

(72) Inventor: Christopher Iveson, Sheffield (GB)

(73) Assignee: AESSEAL Plc, Rotherham (GB)

( * ) Notice: Subject to any disclaimer, the term of this patent is extended or adjusted under 35 U.S.C. 154(b) by 172 days.

(21) Appl. No.: 14/377,620

(22) PCT Filed: Feb. 8, 2013

(86) PCT No.: PCT/GB2013/000049
§ 371 (c)(1),
(2) Date: Aug. 8, 2014

(87) PCT Pub. No.: WO2013/117885
PCT Pub. Date: Aug. 15, 2013

(65) Prior Publication Data
US 2014/0346736 A1 Nov. 27, 2014

(30) Foreign Application Priority Data
Feb. 9, 2012 (GB) .................... 1202262.0

(51) Int. Cl.
*F16J 15/16* (2006.01)
*F16J 15/34* (2006.01)

(52) U.S. Cl.
CPC ........... *F16J 15/16* (2013.01); *F16J 15/3496* (2013.01)

(58) Field of Classification Search
None
See application file for complete search history.

(56) References Cited

U.S. PATENT DOCUMENTS

2008/0210680 A1* 9/2008 Hayashi ............ H01L 21/68742
219/444.1
2009/0067954 A1 3/2009 Lanee et al.

FOREIGN PATENT DOCUMENTS

DE 10017120 C1 2/2002
EP 1482545 A1 12/2004

OTHER PUBLICATIONS

International Search Report dated Sep. 7, 2013 for corresponding application PCT/GB2013/000049.

\* cited by examiner

*Primary Examiner* — Dah-Wei D Yuan
*Assistant Examiner* — Jethro M Pence
(74) *Attorney, Agent, or Firm* — Quine Intellectual Property Law Group, P.C.

(57) ABSTRACT

A device is for supporting within a coating chamber a mechanical seal face (8) having an annular sealing surface. The device includes a frame (1) housing first support means (9) for supporting the seal face when the device is in a first orientation with the annular sealing surface resting on a surface of said first support means. Second support means (2) within the frame supports the seal face when the device is in a second orientation.

19 Claims, 8 Drawing Sheets

DEVICE FOR SUPPORTING MECHANICAL SEAL FACES

RELATED APPLICATIONS

This application claims benefit and priority to PCT patent application Device for Supporting Mechanical Seal Faces, PCT/GB2013/000049, filed Feb. 8, 2013, which claims priority to UK application GB 1202262.0, filed Feb. 9, 2012, which are incorporated in their entirety herein for all purposes.

FIELD OF THE INVENTION

The present invention relates to mechanical seal faces and, in particular, to synthetic diamond coatings applied to mechanical seal faces. When used herein the term "synthetic diamond coatings" includes polycrystalline diamond and ultra monocrystalline diamond as well as diamond like coatings such as graphite. One such coating is known as ADLC (Amorphous Diamond Like Coating).

BACKGROUND TO THE INVENTION

A mechanical seal generally comprises a rotating member attached to a pump shaft and a stationary member attached to a pump housing. The rotating member is in direct contact with the stationary member, which provides the seal. Both the rotating member and the stationary member are commonly referred to in the mechanical sealing industry as seal 'faces'. A basic operating principle of mechanical seals is that the seal faces require a 'fluid film' that provides a lubricant between them in order to function correctly.

Applying a synthetic diamond coating to the seal faces can aid in the performance of the mechanical seal in various different applications.

To apply a synthetic diamond coating to mechanical seal faces a coating chamber is used. The mechanical seal faces are placed inside the coating chamber with the surface to be coated facing outwards from the centre of the coating chamber. A jig like device is generally provided to support the mechanical seal face within a recess provided within a part of the jig. The recess is defined by one or more elements of the jig. It has been found that the coating applied to a mechanical seal face located in a jig is typically of varying evenness and in particular tends to increase in depth at the outer edge of the seal face. This is undesirable; a uniformly even coating is required. It has been reported in the industry that applying a synthetic diamond coating to the seal faces aids in the performance of the mechanical seal in various differing applications.

To apply a synthetic diamond coating to mechanical seal faces, a coating chamber is used. The mechanical seal faces are placed inside the coating chamber with the chosen surface that is to be coated facing outwards from the centre of the coating chamber.

It is generally accepted that the coating chamber is charged at a fixed rate per cycle of synthetic diamond coating applied. Therefore the greater number of mechanical seal faces that can be placed in each cycle run, the higher is the cost efficiency which can be achieved per seal face.

The nature of mechanical seal faces is that they are available in various different sizes and heights, and, as they are all of circular geometry, they are very inefficient on space. This causes a problem in creating a fixture to hold the mechanical seal faces in the coating chamber. Solutions aimed at solving this problem involve creating a special fixture per seal face that is to be coated. However this causes large inefficiencies of time and cost. Also potentially thousands of specially created fixtures are required for the many different sizes of mechanical seal faces that might go through the synthetic diamond coating cycle.

STATEMENTS OF THE INVENTION

The present invention relates to a device for supporting within a coating chamber a mechanical seal face having an annular sealing surface, the device comprising a frame and, within the frame, first support means for supporting the seal face when the device is in a first orientation with the annular sealing surface resting on a surface of said first support means, and second support means for supporting the seal face when the device is a second orientation.

Preferably, said first support means provides a planar surface on which the annular sealing surface may be located, said frame being in releasable connection to said first support means, said second support means comprising an array of pins located within said frame and each being independently and longitudinally moveable relative to said frame so as to allow said pins to contact the mechanical seal face such that the mechanical seal face is located between said pins of the array and said support surface.

Preferably, the device includes means for locking the pins to prevent their longitudinal movement relative to the frame.

Preferably, said first support means is removable from said frame.

Preferably, the device includes a pair of spaced apart plates having aligned holes through which the pins extend, one of said plates being moveable radially with respect to the pins to an extent sufficient to lock the pins against longitudinal movement.

Preferably, the aligned holes have diameters larger than those of the pins allowing the pins both angular and axial movement relative to the plates when the holes are aligned.

Preferably, the device is further provided with elongate alignment members which extend through aligned orifices in each said plate. More preferably, the alignment members are provided with means for securing said plates at positions spaced apart by a distance less than the length of the pins.

Preferably, the support member is a board.

Preferably, the device of the invention is able to provide a plurality of side by side recesses, of varying sizes and profiles.

The present invention also provides a method for supporting a mechanical seal face within a coating chamber, the method comprising providing a device of the invention, locating the mechanical seal face within said device and locating the device within said coating chamber.

BRIEF DESCRIPTION OF THE DRAWINGS

The accompanying drawings are as follows:

FIGS. 6 to 8 show the way in which the pins interact with said mechanical seal faces when plates 13 and 14 are shifted radially.

DETAILED DESCRIPTION OF THE INVENTION

The invention will now be described, by way of example only, with reference to the accompanying drawings.

Figure 1:
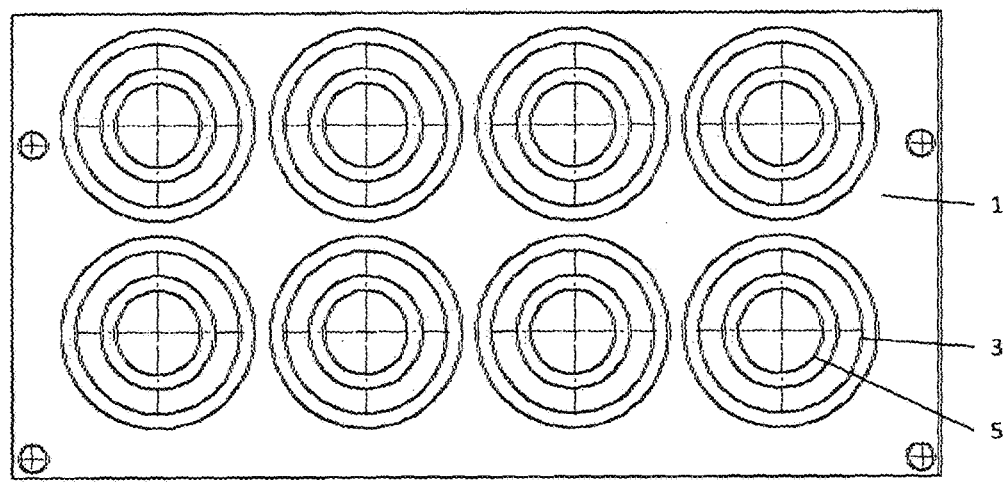
Figure 2:
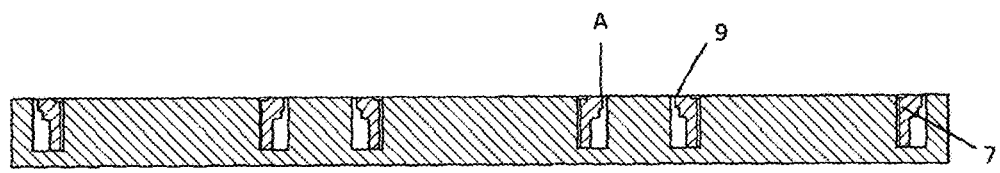
Figure 2A:
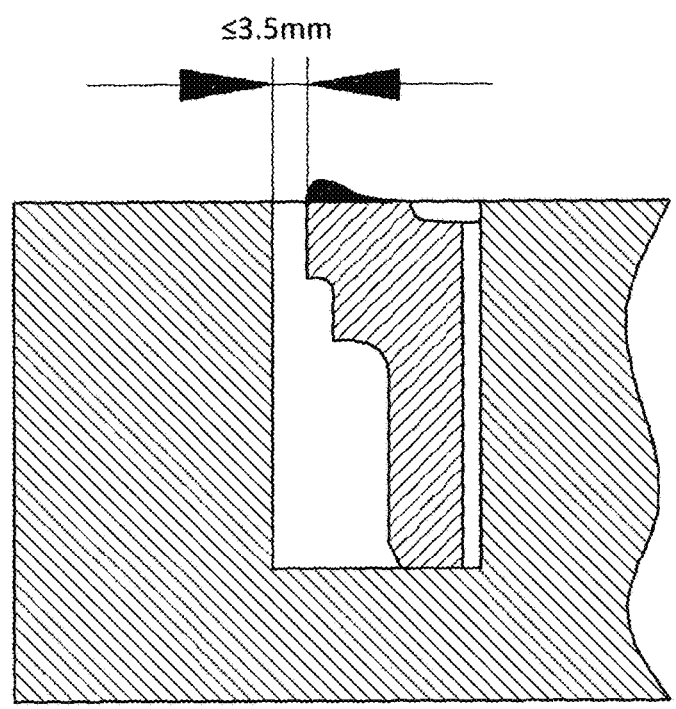
Figure 3:
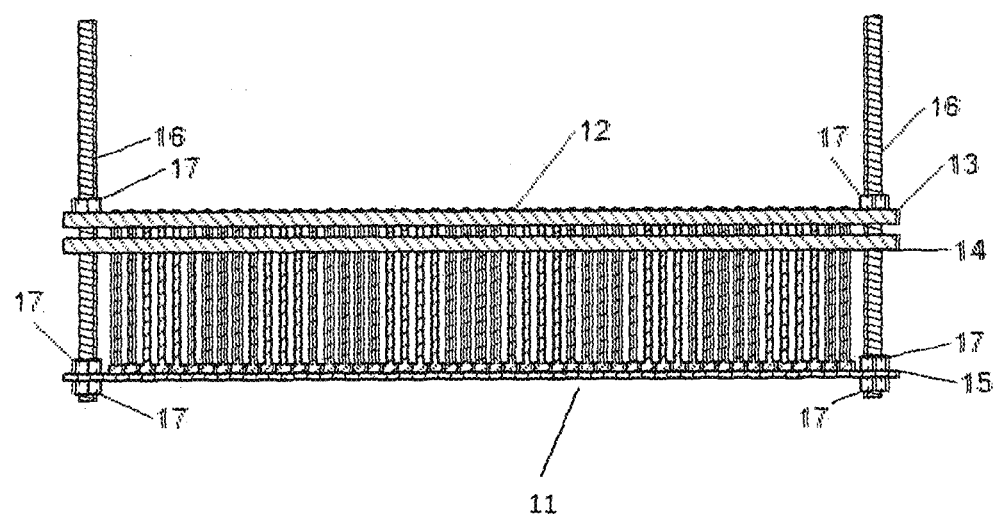
FIG. 3 is a side view of an embodiment of the invention.

FIG. 3 shows a side view of a fixture 11 that comprises a number of pins 12, a first plate 13, a second plate 14, a third plate 15, aligning rods 16, and various nuts 17.

Each individual pin 12 is aligned by corresponding concentric orifices located within said first plate 13 and said second plate 14. The pins 12 freely move vertically through the orifices of first plate 13 and second plate 14, to the point where the pins 12 engage with third plate 15, which prevents pins 12 from escaping out of fixture 11.

The first plate 13, second plate 14 and third plate 15 are aligned via aligning rods 16, and are vertically spaced by nuts 17.

Figure 4:
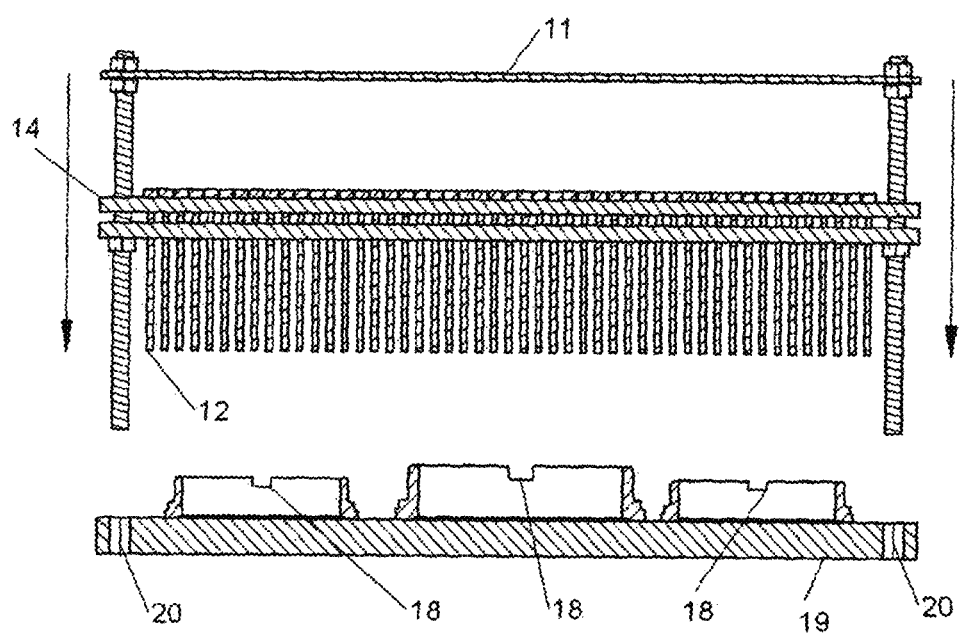
FIG. 4 shows the embodiment of FIG. 3 rotated 180 degrees from that of FIG. 3 and ready to be placed over the top of mechanical seal faces.

FIG. 4 is a side view of fixture 11 that has been turned 180 degrees so that the pins 12 have fallen due to gravity until the enlarged ends of pins 12 engage with second plate 14 and can go no further.

Also shown are an undetermined number of mechanical seal faces 18 of varying sizes, which are laid on a board 19. The surfaces of the mechanical seal faces 18 that are to have the synthetic diamond coating applied are in direct contact with board 19. Said board also comprises a number of orifices 20, which correspond to said aligning rods 16 from said fixture 11.

Figure 5:
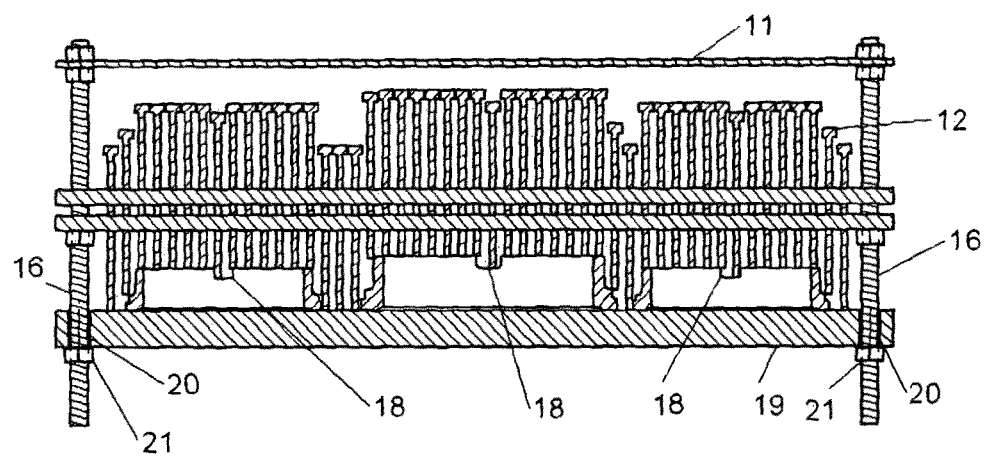
FIG. 5 shows the embodiment of Figure [M]3 positioned in place, with its pins forming around the mechanical seal faces.

FIG. 5 shows fixture 11 laid over the top of the seal faces 18 and it can be seen that pins 12 have formed the shape of said mechanical seal faces 18. FIG. 5 also shows how the aligning rods 16 are inserted into orifices 20 of the board 19 and spaced at a distance as to eliminate flex between the first plate 13, second plate 14 and third plate 15.

Figure 6:
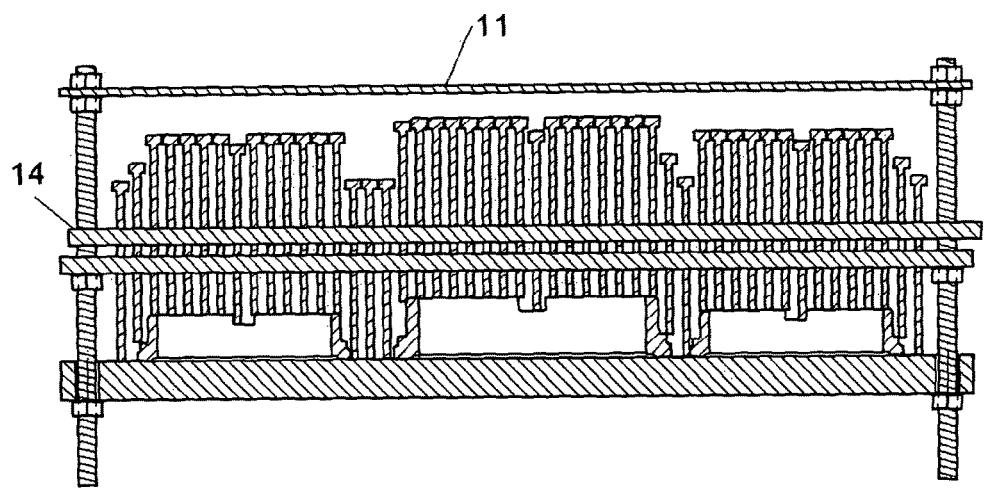
FIG. 6 is similar to FIG. 5 but showing the pins locked in position once they are set in place.

The board 19 is then locked to said aligning rods 16, by some secondary nuts 21. FIG. 6 shows how said second plate 14 of said fixture 11 is offset from said first plate, which locks said pins in position.

Figure 7:
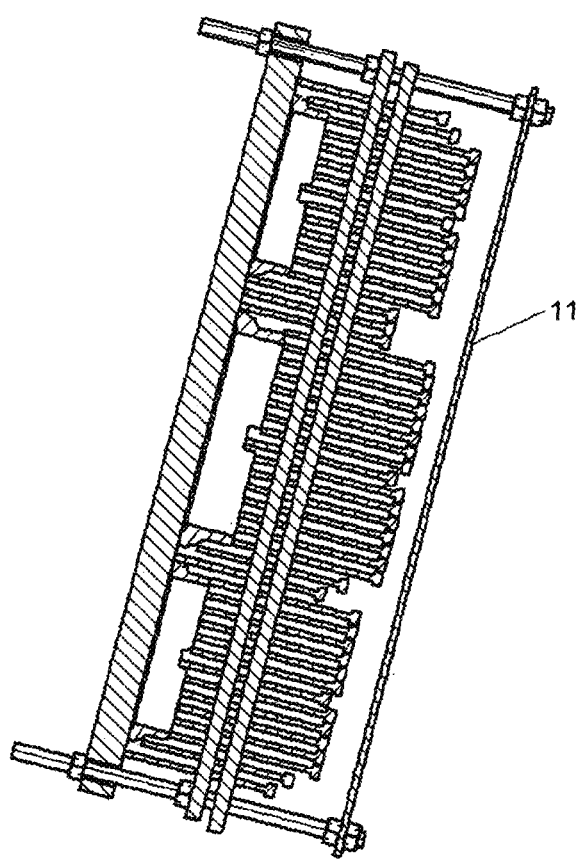
FIG. 7 shows the fixture assembly of FIG. 6 positioned inside a coating chamber.

FIG. 7 shows how said fixture 11 is then angled inside a coating chamber. At this stage, the fixture is fixed inside the coating chamber.

Figure 8:
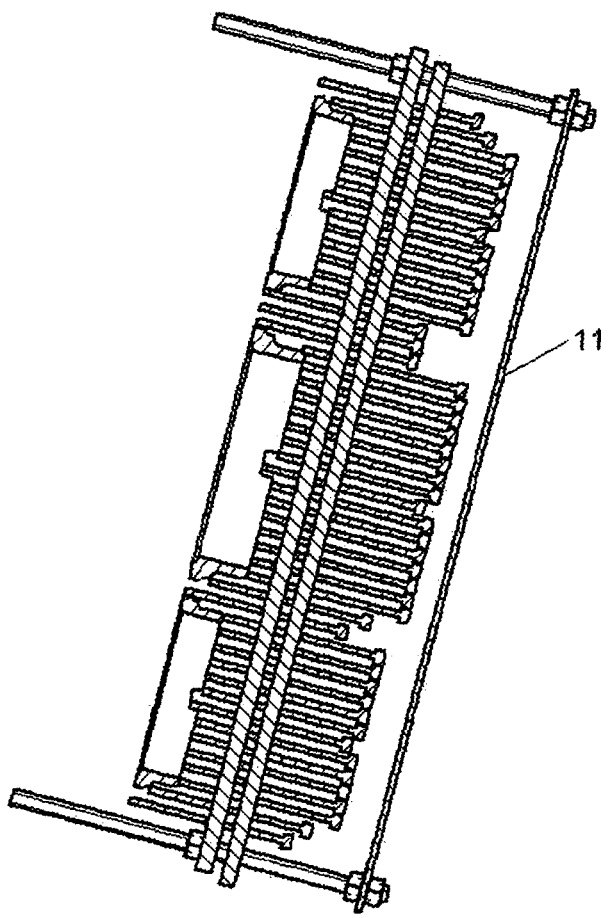
FIG. 8 shows the fixture assembly of FIG. 6 inside the coating chamber and with base board 19 removed.

FIG. 8 shows that said secondary nuts 21 are then removed, and said board 19 is removed from said fixture 11. The diamond coating can then be applied to the surfaces of the mechanical seal faces 18 which were in contact with board 19. The angular and axial movement of the pins 12 allows them to bear on the outer or inner edge of the mechanical seal face, holding it in place.

FIG. 7 shows how the angular and axial movement of the pins 12 allows them to bear on the outer or inner edge of the mechanical seal face, holding it in place.

The invention claimed is:

1. A device for supporting within a coating chamber a mechanical seal comprising an annular sealing surface and a second surface on a side of the seal opposite the sealing surface,
the device comprising:
a frame and,
within the frame, a first support configured to support the seal when the device is in a first orientation with the annular sealing surface resting on a surface of said first support, and
a second support configured to support the seal in direct contact with the second surface when the device is in a second orientation;
wherein said first support provides a planar surface on which the annular sealing surface may be located and the frame being in releasable connection to said first support, said second support comprising an array of pins located within said frame and each being independently and longitudinally moveable relative to said frame so as to allow said pins to contact the mechanical seal such that the mechanical seal is located between said pins of the array and said first support.

2. A device according to claim 1 and further including a means for locking the pins relative to the frame.

3. A device according to claim 1, wherein said first support is removable from said frame.

4. A device according to claim 1, wherein the device includes a pair of spaced apart plates having aligned holes through which the pins extend, one of said plates being moveable radially with respect to the pins to misalign the holes thereby locking the pins against longitudinal movement.

5. A device according to claim 4, where the aligned holes of a first of the paired plates have diameters larger than those of a second of the paired plates, allowing the pins both angular and axial movement relative to the plates when the holes are aligned.

6. A device according to claim 5, wherein the device is further provided with elongate alignment members which extend through aligned orifices in each said plate.

7. A device according to claim 6, wherein said alignment members are provided with means for securing said plates at positions spaced apart by a distance less than the length of the pins.

8. A device according to claim 1, wherein said first support is a board.

9. A device according to claim 1, wherein the device is adapted to support a plurality of seal faces of varying sizes and profiles.

10. A method for supporting a mechanical seal within a coating chamber, the method comprising providing a device according to claim 1, providing the mechanical seal, locating the mechanical seal within said device and locating the device within said coating chamber.

11. The device of claim 1, wherein the first support is a first support means for supporting the mechanical seal in the first orientation, and the second support is a second support means for supporting the seal in the second orientation.

12. The device of claim 1, wherein the first support and second support are configured to contact the mechanical seal on opposite sides of the mechanical seal.

13. The device of claim 1, wherein a side of the mechanical seal opposite the sealing surface rests on the second support in the second orientation.

14. The device of claim 13, wherein the second support comprises an array of pins.

15. The device of claim 1, wherein the device is configured so that the first support can be removed from the device while the mechanical seal is supported by the second support.

16. The device of claim 1, wherein the support provided by the first support in the first orientation and the support provided by the second support in the second orientation are each support against the force of gravity.

17. The device of claim 4, wherein the pair of the aligned holes are axially aligned with an individual pin running therethrough.

18. The device of claim 1, wherein the second sealing surface is not on a side of the mechanical seal that is resting on the surface of the first support.

19. The device of claim 1, wherein with the first support horizontal below the mechanical seal, the second support pins are directly above the mechanical seal.

\* \* \* \* \*